United States Patent
Yue et al.

(10) Patent No.: US 7,292,254 B1
(45) Date of Patent: Nov. 6, 2007

(54) APPARATUS, SYSTEM, AND METHOD FOR CLIPPING GRAPHICS PRIMITIVES WITH REDUCED SENSITIVITY TO VERTEX ORDERING

(75) Inventors: Lordson L. Yue, Foster City, CA (US); Vimal S. Parikh, Fremont, CA (US); Andrew J. Tao, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 17 days.

(21) Appl. No.: 11/294,791

(22) Filed: Dec. 5, 2005

(51) Int. Cl.
*G09G 5/00* (2006.01)
*G06T 1/00* (2006.01)

(52) U.S. Cl. .................. 345/620; 345/619; 345/418

(58) Field of Classification Search ............. 345/620, 345/623, 625
See application file for complete search history.

(56) References Cited

U.S. PATENT DOCUMENTS

| | | | |
|---|---|---|---|
| 3,889,107 A | 6/1975 | Sutherland | |
| 4,958,305 A | 9/1990 | Piazza | |
| 5,051,737 A | 9/1991 | Akeley et al. | |
| 5,613,052 A | 3/1997 | Narayanaswami | |
| 5,720,019 A | 2/1998 | Koss et al. | |
| 5,877,773 A | 3/1999 | Rossin et al. | |
| 5,949,421 A | 9/1999 | Ogletree et al. | |
| 5,986,669 A | 11/1999 | Kirkland | |
| 6,052,129 A | 4/2000 | Fowler et al. | |
| 6,061,066 A | 5/2000 | Priem | |
| 6,181,352 B1 | 1/2001 | Kirk et al. | |
| 6,208,361 B1 | 3/2001 | Gossett | |
| 6,359,630 B1 | 3/2002 | Morse et al. | |
| 6,459,438 B1 | 10/2002 | Mang | |
| 6,507,348 B1 | 1/2003 | Mang et al. | |
| 6,512,524 B1 * | 1/2003 | Mang | 345/622 |
| 6,552,723 B1 | 4/2003 | Duluk, Jr. et al. | |
| 6,577,305 B1 | 6/2003 | Duluk, Jr. et al. | |
| 6,686,924 B1 * | 2/2004 | Mang et al. | 345/620 |
| 6,782,432 B1 | 8/2004 | Nelson et al. | |
| 6,928,646 B1 | 8/2005 | James et al. | |
| 2003/0095137 A1 | 5/2003 | Lu et al. | |

OTHER PUBLICATIONS

U.S. Appl. No. 11/195,389, filed Aug. 2, 2005, Moreton et al.

* cited by examiner

*Primary Examiner*—Kee M. Tung
*Assistant Examiner*—Chante Harrison
(74) *Attorney, Agent, or Firm*—Cooley Godward Kronish LLP

(57) ABSTRACT

Apparatus, system, and method for clipping graphics primitives are described. In one embodiment, a graphics processing apparatus includes a mapping unit and a clipping engine that is connected to the mapping unit. The mapping unit is configured to map a graphics primitive onto a canonical representation. The clipping engine is configured to perform a set of clipping operations with respect to the canonical representation.

13 Claims, 4 Drawing Sheets

APPARATUS, SYSTEM, AND METHOD FOR CLIPPING GRAPHICS PRIMITIVES WITH REDUCED SENSITIVITY TO VERTEX ORDERING

BRIEF DESCRIPTION OF THE INVENTION

The invention relates generally to graphics processing. More particularly, the invention relates to an apparatus, system, and method for clipping graphics primitives with reduced sensitivity to vertex ordering.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons. Typically, a graphics primitive is defined by a set of vertices having a particular order that is specified by a graphics program. For example, one graphics primitive can be defined by three vertices that are ordered as $(V_0, V_1, V_2)$, while another graphics primitive can be defined by the same three vertices that are ordered differently as $(V_2, V_0, V_1)$. In this example, the two graphics primitives are, in fact, visually identical, even though they differ in their vertex ordering.

Conventional graphics processing systems sometimes implement techniques for clipping graphics primitives. Clipping typically refers to a set of operations that determine which portions of an object are to be displayed with respect to a set of clipping planes. Various techniques have been developed for clipping graphics primitives. Examples of these techniques include the Cohen-Sutherland technique, the Liang-Barsky technique, the Sutherland-Hodgeman technique, and the Weiler technique. Of these techniques, the Sutherland-Hodgeman technique is perhaps the most commonly used. For example, to clip a polygon with respect to six clipping planes, the Sutherland-Hodgeman technique typically clips each edge of the polygon with respect to a first clipping plane to produce a first clipped polygon. Each edge of the first clipped polygon is then typically clipped with respect to a second clipping plane to produce a second clipped polygon. The second clipped polygon is then typically clipped with respect to a third clipping plane, and so on until all six clipping planes have been processed.

When clipping a graphics primitive with respect to a set of clipping planes, it is desirable to produce a consistent result, irrespective of a particular vertex ordering of the graphics primitive. However, a conventional clipping technique typically involves a number of operations, such as additions, compares, multiplications, reciprocals, and subtractions, and implementing these operations in realizable hardware often produces a result that is relatively sensitive to the vertex ordering. In particular, a graphics primitive is sometimes clipped by performing a set of floating point calculations, which often involve some approximation or rounding because of a limited precision range associated with floating point numbers. As can be appreciated, floating point calculations are typically not associative, such that $(x+y)+z \neq x+(y+z)$ and $(x \times y) \times z \neq x \times (y \times z)$ for floating point numbers x, y, and z. For example, a floating calculation of $(1e^{100} - 1e^{100}) + 1$ can give a result that is 1, whereas a floating calculation of $(1e^{100} + 1) - 1e^{100}$ can give a result that is 0. As a result, an output of floating point calculations for clipping a graphics primitive can be dependent upon an order in which these floating point calculations are performed, which, in turn, can be dependent upon a vertex ordering of the graphics primitive. Such dependency on vertex ordering can lead to inconsistencies when clipping graphics primitives that simply differ in their vertex ordering and can produce artifacts, such as when rendering the graphics primitives sequentially or at the same time. For example, differences in resulting coordinate data can lead to one of the graphics primitives being subsequently culled, while another one of the graphics primitives is not subsequently culled.

It is against this background that a need arose to develop the apparatus, system, and method described herein.

SUMMARY OF THE INVENTION

In one aspect, the invention relates to a graphics processing apparatus. In one embodiment, the graphics processing apparatus includes a mapping unit and a clipping engine that is connected to the mapping unit. The mapping unit is configured to map a graphics primitive onto a canonical representation. The clipping engine is configured to perform a set of clipping operations with respect to the canonical representation.

In another embodiment, the graphics processing apparatus includes a clipping module. The clipping module is configured to clip a graphics primitive with respect to a set of clipping planes to produce a clipped graphics primitive that is substantially invariant with respect to an initial order of vertices defining the graphics primitive.

In another aspect, the invention relates to a graphics processing method. In one embodiment, the graphics processing method includes determining a relative positioning of initial vertices defining a graphics primitive. The graphics processing method also includes sorting the initial vertices based on the relative positioning so as to have a canonical order. The graphics processing method further includes clipping the graphics primitive with respect to a clipping plane by accessing the initial vertices based on the canonical order.

Advantageously, some embodiments of the invention operate in accordance with an improved technique for clipping graphics primitives. In particular, the improved technique allows clipping operations to be performed in a deterministic manner, thus producing a consistent result that has reduced sensitivity to vertex ordering. In addition, such reduced sensitivity to vertex ordering is achieved with little or no additional cost or complexity as compared with a conventional clipping implementation.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
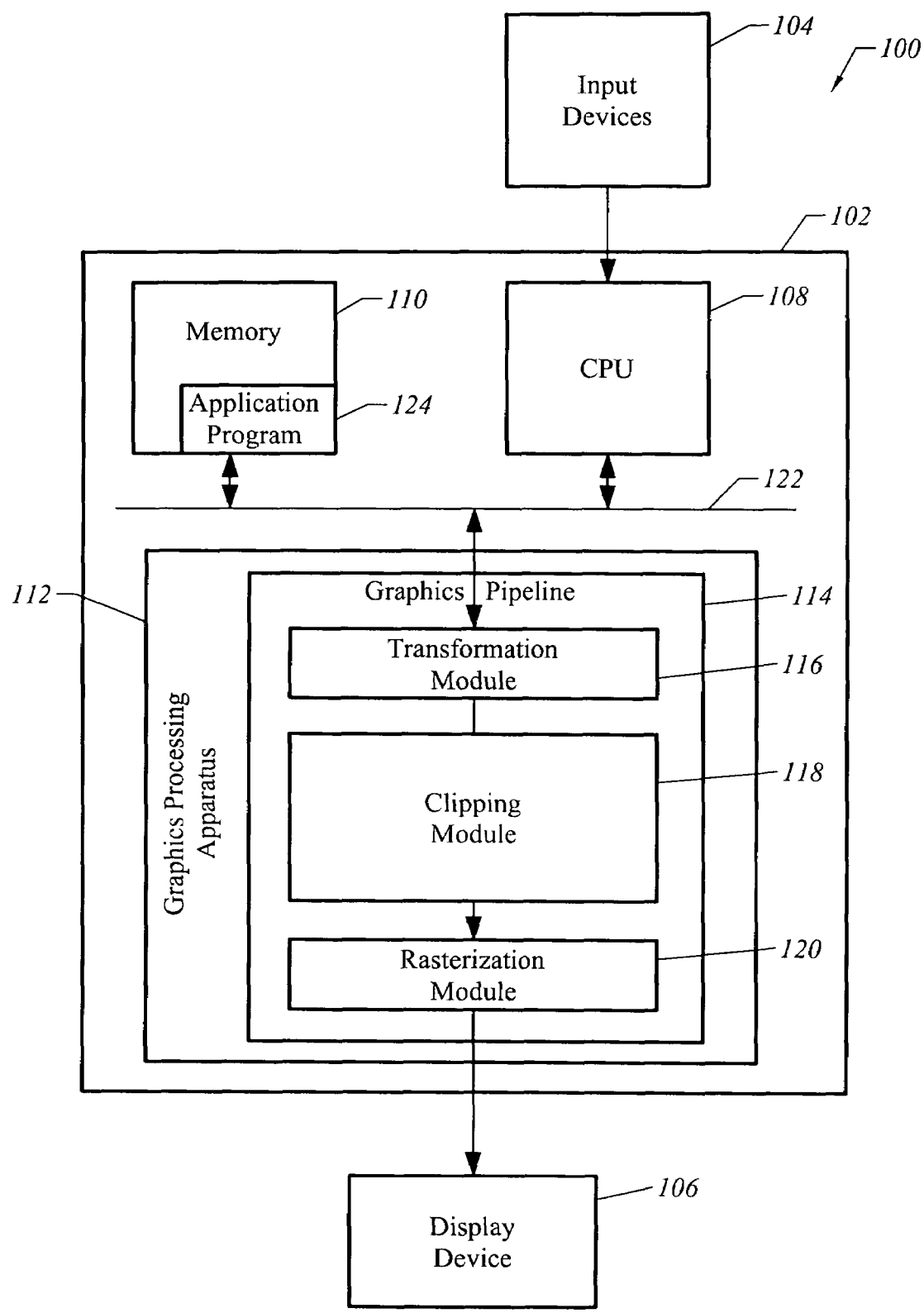
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a memory 110 over a bus 122. Referring to FIG. 1, the memory 110 stores an application program 124, which can be, for example, a graphics program. The memory 110 can include, for example, a Random Access Memory ("RAM") and a Read Only Memory ("ROM"). As illustrated in FIG. 1, the computer 102 also includes a graphics processing apparatus 112 that is connected to the CPU 108 and the memory 110 over the bus 122. The graphics processing apparatus 112 can be, for example, a Graphics Processing Unit ("GPU").

In the illustrated embodiment, the graphics processing apparatus 112 performs a number of operations to display an object using the display device 106. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation.

As illustrated in FIG. 1, the transformation module 116 receives a set of graphics primitives that represent the object to be displayed. Each of the graphics primitives is defined by a set of vertices having an order that is specified by the application program 124. In the illustrated embodiment, the graphics primitives correspond to polygons. However, it is contemplated that other types of graphics primitives can also be used. Referring to FIG. 1, the transformation module 116 performs a number of transformation operations on the graphics primitives. For example, coordinate data of vertices defining the graphics primitives can be rotated, scaled, translated, or converted from one coordinate space into another coordinate space. It is also contemplated that color data, specularity data, or texture data of the vertices can be modified, such as in connection with lighting operations. The transformation module 116 then delivers the graphics primitives that have been transformed in such manner to the clipping module 118.

Referring to FIG. 1, the clipping module 118 clips the graphics primitives with respect to a set of clipping planes to produce clipped graphics primitives. The clipping module 118 then delivers the clipped graphics primitives to the rasterization module 120. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. It is further contemplated that the clipping planes can alternatively, or in conjunction, include a w=0 plane in homogeneous space. As can be appreciated, the w=0 plane can be positioned at a viewpoint of the viewing region, such that portions of the object that lie on a w<0 side of that plane are behind the viewpoint and are, thus, not visible. The clipping module 118 serves to increase efficiency of the graphics pipeline 114, as further processing on portions of the object that lie outside the viewing region need not be performed. Also, by using the set of model clipping planes, the clipping module 118 allows portions of the object that were previously hidden from view to be visualized. Furthermore, by using the w=0 plane, the clipping module 118 serves to avoid further processing on portions of the object that are behind the viewpoint.

Advantageously, the clipping module 118 operates in accordance with an improved technique that provides reduced sensitivity to vertex ordering as specified by the application program 124. In particular, when clipping a graphics primitive with respect to the clipping planes, the clipping module 118 initially maps the graphics primitive onto a canonical representation. The clipping module 118 then clips the graphics primitive with respect to the clipping planes based on the canonical representation. By operating in such manner, the clipping module 118 allows clipping operations to be performed in a deterministic manner with respect to the canonical representation, thus producing a consistent result that has reduced sensitivity to a vertex ordering of the graphics primitive. In addition, such reduced sensitivity is achieved with little or no additional cost or complexity as compared with a conventional clipping implementation.

Referring to FIG. 1, the rasterization module 120 performs a number of interpolation operations on the clipped graphics primitives to produce a set of pixels that represent the object to be displayed. For example, coordinate data of vertices defining the clipped graphics primitives can be interpolated to assign the pixels to represent the object. It is also contemplated that color data, specularity data, or texture data of the vertices can be interpolated in connection with pixel assignment. The rasterization module 120 then delivers the pixels for display using the display device 106.

Figure 2:
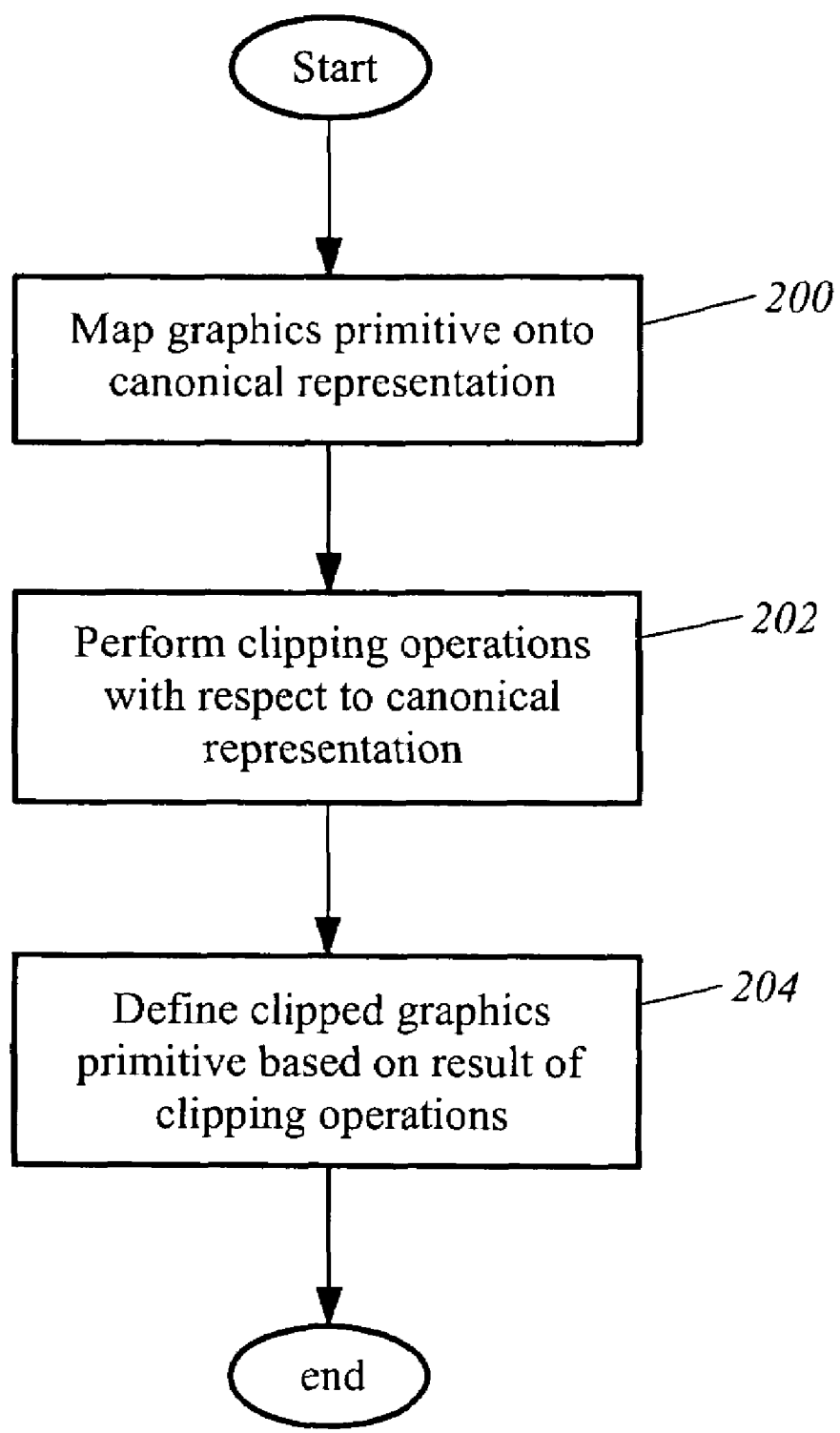
FIG. 2 illustrates a flow chart for clipping a graphics primitive, according to an embodiment of the invention.

Attention next turns to FIG. 2, which illustrates a flow chart for clipping a graphics primitive, according to an embodiment of the invention. In particular, FIG. 2 illustrates operations that can be performed by the clipping module 118 to clip the graphics primitive with respect to a set of clipping planes. In the illustrated embodiment, the graphics primitive is defined by a set of initial vertices having an initial order that is specified by an application program, such as the application program 124.

Referring to FIG. 2, the clipping module 118 initially maps the graphics primitive onto a canonical representation (block 200). In the illustrated embodiment, the clipping module 118 performs such mapping by reordering the initial vertices so as to have a canonical order. Advantageously, the canonical order is specified based on a relative positioning of the initial vertices with respect to one another and is invariant with respect to the initial order. In the illustrated embodiment, the initial order specifies a handedness of the graphics primitive that is either counterclockwise or clockwise, and reordering the initial vertices can sometimes modify the handedness, such as from counterclockwise to clockwise or from clockwise to counterclockwise. As can be appreciated, the handedness of the graphics primitive typically specifies an orientation of the graphics primitive with respect to a viewpoint, such as one that is either frontfacing or backfacing.

Next, the clipping module 118 performs a set of clipping operations with respect to the canonical representation (block 202). In the illustrated embodiment, the clipping module 118 performs the clipping operations based on any suitable clipping technique, such as a conventional clipping technique. In particular, to clip the graphics primitive with respect to the clipping planes, the clipping module 118 accesses the initial vertices based on the canonical order to produce a set of new vertices. Since the canonical order is invariant with respect to the initial order, the clipping operations are performed in a deterministic manner that is irrespective of the initial order, thus producing a consistent result that exhibits little or no dependency upon the initial order.

Referring to FIG. 2, the clipping module 118 next defines a clipped graphics primitive based on the result of the clipping operations (block 204). In the illustrated embodiment, the clipping module 118 defines the clipped graphics primitive based on the new vertices that are produced by the clipping operations. In some instances, the clipping module 118 can also define the clipped graphics primitive based on one or more of the initial vertices. In the event that reordering the initial vertices has modified the handedness of the graphics primitive, the clipping module 118 reorders various vertices defining the clipped graphics primitive so as to restore the handedness of the graphics primitive. As can be appreciated, restoring the handedness is typically desirable so that the clipped graphics primitive has the same orientation with respect to the viewpoint, such as in connection with backface culling operations.

The operations described in connection with FIG. 2 can be further understood with reference to FIG. 3A and FIG. 3B, which illustrate examples of clipping with respect to a clipping plane 300. In the illustrated examples, portions of an object that lie inside of the clipping plane 300 are to be retained for further processing, while portions of the object that lie outside of the clipping plane 300 are to be discarded.

Figure 3A:
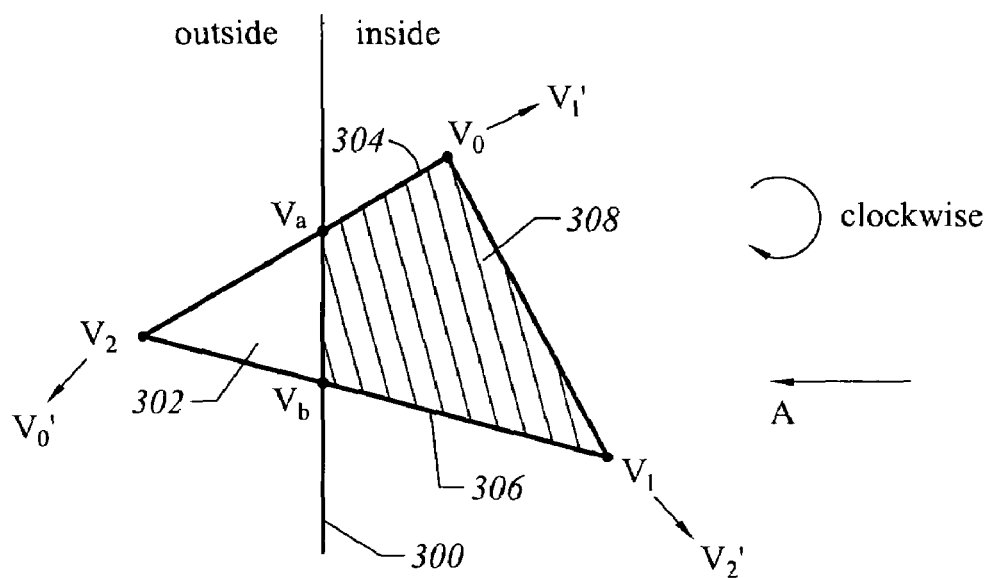
FIG. 3A and FIG. 3B illustrate examples of clipping graphics primitives with respect to a clipping plane, according to an embodiment of the invention.

FIG. 3A illustrates a graphics primitive 302 that corresponds to a triangle, which is a polygon that is simple and convex. As can be appreciated, a polygon is typically referred to as being simple if it has edges that define a single, non-intersecting boundary, and a simple polygon is typically referred to as being convex if it has no internal angles that are greater than 180°. Other examples of polygons that are simple and convex include quadrilaterals, pentagons, hexagons, and heptagons.

As illustrated in FIG. 3A, the graphics primitive 302 is defined by a set of vertices that are initially ordered as ($V_0$, $V_1$, $V_2$), such that vertex $V_0$ has an initial sequence position that is first, vertex $V_1$ has an initial sequence position that is second, and vertex $V_2$ has an initial sequence position that is third. Different pairs of the vertices define various edges of the graphics primitive 302. For example, the pair of vertices ($V_2$, $V_0$) define an edge 304 of the graphics primitive 302, and the pair of vertices ($V_1$, $V_2$) define an edge 306 of the graphics primitive 302. In the illustrated example, the initial order of the vertices defining the graphics primitive 302 specifies an initial handedness that is clockwise. However, it is contemplated that the initial handedness can be counterclockwise in accordance with another implementation.

Referring to FIG. 3A, the clipping plane 300 is intersected by the pair of edges 304 and 306, and, thus, it can be appreciated that the graphics primitive 302 requires clipping with respect to the clipping plane 300. To reduce sensitivity to the initial order of the vertices when clipping the graphics primitive 302, the vertices are reordered based on a relative positioning of the vertices with respect to one another. As can be appreciated, the relative positioning of the vertices is typically determined by comparing coordinate data of the vertices. In the illustrated example, reordering the vertices is performed by determining which one of the vertices is positioned farthest along a particular direction in a coordinate space and assigning a first canonical sequence position to that vertex. Canonical sequence positions are assigned to remaining ones of the vertices by determining which remaining one of the vertices is positioned second farthest along that direction and assigning a second canonical sequence position to that vertex, and so on until the vertices are suitably reordered. In the event that particular ones of the vertices are equally positioned along that direction, canonical sequence positions are assigned to those vertices based on their relative positioning along another direction, such as an orthogonal direction.

As illustrated in FIG. 3A, the vertex $V_2$ is positioned farthest along a direction indicated by arrow A, the vertex $V_0$ is positioned second farthest along that direction, and the vertex $V_1$ is positioned least farthest along that direction. In the illustrated example, the vertices are reordered as ($V_2$, $V_0$, $V_1$), such that the vertex $V_2$ has a canonical sequence position that is first, while the vertices $V_0$ and $V_1$ have canonical sequence positions that are second and third, respectively. In such manner, the vertices are readily accessed based on their canonical sequence positions in connection with subsequent clipping operations. In the illustrated example, reordering the vertices is performed while retaining the initial handedness, namely one that is clockwise. However, it is contemplated that the initial handedness can be modified in accordance with another implementation. As can be appreciated with reference to FIG. 3A, reordering the vertices has effectively mapped the graphics primitive 302 onto a canonical representation that is defined by a set of vertices having a canonical order. In particular, the canonical representation is defined by a set of vertices that are ordered as ($V_0'$, $V_1'$, $V_2'$), and the vertex $V_2$ is mapped onto vertex $V_0'$ that has a canonical sequence position that is first, the vertex $V_0$ is mapped onto vertex $V_1'$ that has a canonical sequence position that is second, and the vertex $V_1$ is mapped onto vertex $V_2'$ that has a canonical sequence position that is third.

Referring to FIG. 3A, the pair of edges 304 and 306 are clipped with respect to the clipping plane 300 to produce a clipped graphics primitive 308, which corresponds to a shaded portion of the graphics primitive 302. In the illustrated example, a set of clipping operations are performed to determine new vertices $V_a$ and $V_b$, which correspond to intersections of the pair of edges 304 and 306 with respect to the clipping plane 300. In particular, the clipping operations are performed by accessing the vertices defining the graphics primitive 302 based on their canonical sequence positions. In such manner, the clipping operations are performed in a deterministic manner, such that the new vertices $V_a$ and $V_b$ are invariant with respect to the initial order of the vertices defining the graphics primitive 302.

As illustrated in FIG. 3A, the clipped graphics primitive 308 corresponds to a quadrilateral. Indeed, since the graphics primitive 302 corresponds to a triangle, it can be appreciated that clipping the graphics primitive 302 with respect to the clipping plane 300 produces either another triangle or a quadrilateral. Referring to FIG. 3A, the clipped graphics primitive 308 is defined by the new vertices $V_a$ and $V_b$ and the vertices $V_0$ and $V_1$, which are ordered as ($V_a$, $V_0$, $V_1$, $V_b$). Since the order of the vertices defining the clipped graphics primitive 308 retains the initial handedness, namely one that is clockwise, reordering of these vertices is not required.

Figure 3B:
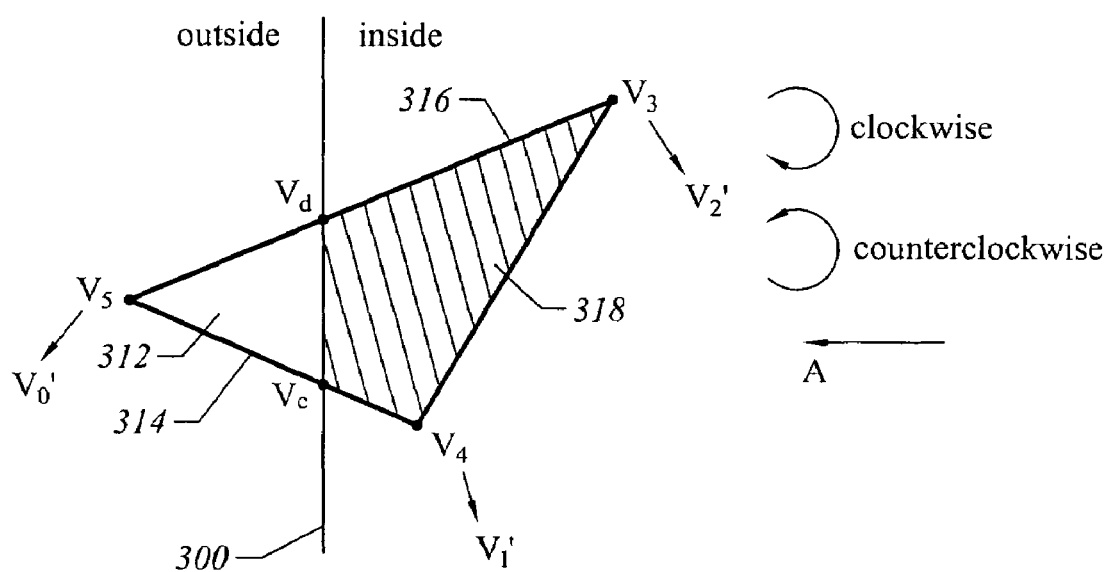

FIG. 3B illustrates another graphics primitive 312 that also corresponds to a triangle. The graphics primitive 312 is defined by a set of vertices that are initially ordered as ($V_3$, $V_4$, $V_5$), such that vertex $V_3$ has an initial sequence position that is first, vertex $V_4$ has an initial sequence position that is second, and vertex $V_5$ has an initial sequence position that is third. Different pairs of the vertices define various edges of the graphics primitive 312. For example, the pair of vertices ($V_4$, $V_5$) define an edge 314 of the graphics primitive 312, and the pair of vertices ($V_5$, $V_3$) define an edge 316 of the graphics primitive 312. As in the previous example, the initial order of the vertices defining the graphics primitive 312 specifies an initial handedness that is clockwise. However, it is contemplated that the initial handedness can be counterclockwise in accordance with another implementation.

Referring to FIG. 3B, the clipping plane 300 is intersected by the pair of edges 314 and 316, and, thus, it can be appreciated that the graphics primitive 312 requires clipping with respect to the clipping plane 300. Again, to reduce sensitivity to the initial order of the vertices when clipping the graphics primitive 312, the vertices are reordered based on a relative positioning of the vertices with respect to one another.

As illustrated in FIG. 3B, the vertex $V_5$ is positioned farthest along the direction indicated by arrow A, the vertex $V_4$ is positioned second farthest along that direction, and the vertex $V_3$ is positioned least farthest along that direction. Accordingly, the vertices are reordered as ($V_5$, $V_4$, $V_3$), such that the vertex $V_5$ has a canonical sequence position that is first, while the vertices $V_4$ and $V_3$ have canonical sequence positions that are second and third, respectively. In such manner, the vertices are readily accessed based on their canonical sequence positions in connection with subsequent clipping operations. In the illustrated example, reordering the vertices modifies the initial handedness, namely from clockwise to counterclockwise. However, it is contemplated that the initial handedness can be retained in accordance with another implementation. As in the previous example, reordering the vertices has effectively mapped the graphics primitive 312 onto a canonical representation that is defined by a set of vertices that are ordered as ($V_0'$, $V_1'$, $V_2'$).

Referring to FIG. 3B, the pair of edges 314 and 316 are clipped with respect to the clipping plane 300 to produce a clipped graphics primitive 318, which corresponds to a shaded portion of the graphics primitive 312. In the illustrated example, a set of clipping operations are performed to determine new vertices $V_c$ and $V_d$, which correspond to intersections of the pair of edges 314 and 316 with respect to the clipping plane 300. In particular, the clipping operations are performed by accessing the vertices defining the graphics primitive 312 based on their canonical sequence positions, such that the new vertices $V_c$ and $V_d$ are invariant with respect to the initial order of the vertices defining the graphics primitive 312.

As illustrated in FIG. 3B, the clipped graphics primitive 318 also corresponds to a quadrilateral. In particular, the clipped graphics primitive 318 is defined by the new vertices $V_c$ and $V_d$ and the vertices $V_4$ and $V_3$, which are initially ordered as ($V_c$, $V_4$, $V_3$, $V_d$). In the illustrated example, the vertices defining the clipped graphics primitive 318 are reordered as ($V_d$, $V_3$, $V_4$, $V_c$) so as to restore the initial handedness, namely one that is clockwise.

The foregoing provides an overview of some embodiments of the invention. Attention next turns to FIG. 4, which illustrates a clipping module 400 that is implemented in accordance with an embodiment of the invention. The clipping module 400 includes a vertex memory 402, which stores a set of initial vertices that define a graphics primitive and that are initially ordered as ($V_0$, $V_1$, $V_2$). The vertex memory 402 can be implemented as, for example, a RAM that stores the initial vertices based on their initial sequence positions.

Figure 4:
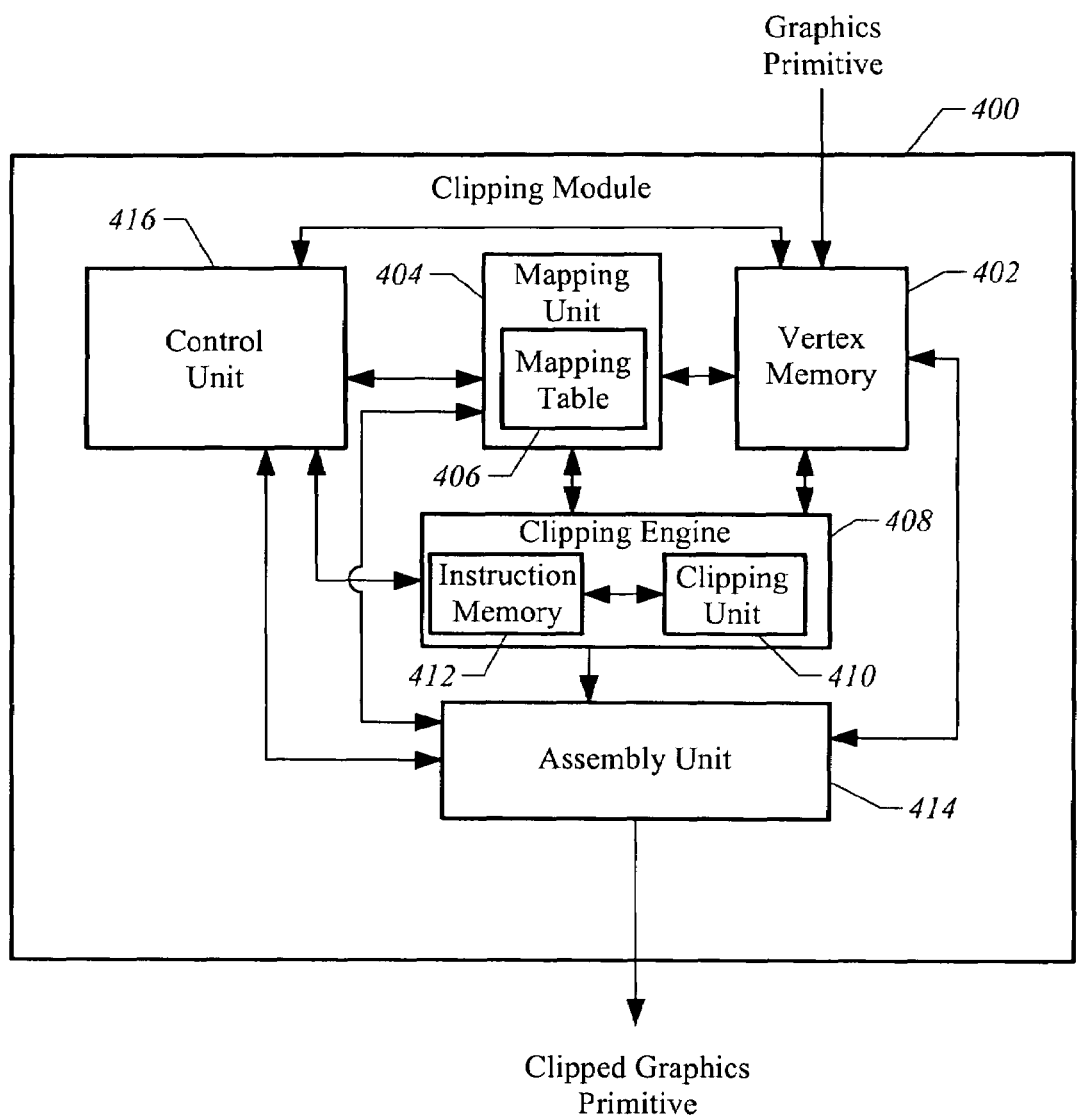
FIG. 4 illustrates a clipping module that is implemented in accordance with an embodiment of the invention.

As illustrated in FIG. 4, the clipping module 400 also includes a mapping unit 404 that is connected to the vertex memory 402. The mapping unit 404 sorts the initial vertices so as to assign canonical sequence positions to the initial vertices. Referring to FIG. 4, the mapping unit 404 sorts the initial vertices based on contents of a mapping table 406, which can be implemented as, for example, a ROM. Table 1 below provides an example of the contents of the mapping table 406.

TABLE 1

| Relative Positioning of Initial Vertices ($V_0$, $V_1$, $V_2$) | Sorted Initial Vertices | Flip Code |
|---|---|---|
| $V_2 > V_0 > V_1$ | ($V_2$, $V_0$, $V_1$) | 0 |
| $V_2 > V_1 > V_0$ | ($V_2$, $V_1$, $V_0$) | 1 |
| $V_1 > V_0 > V_2$ | ($V_1$, $V_0$, $V_2$) | 1 |
| $V_1 > V_2 > V_0$ | ($V_1$, $V_2$, $V_0$) | 0 |
| $V_0 > V_1 > V_2$ | ($V_0$, $V_1$, $V_2$) | 0 |
| $V_0 > V_2 > V_1$ | ($V_0$, $V_2$, $V_1$) | 1 |

In the illustrated embodiment, the mapping unit 404 sorts the initial vertices based on their relative positioning in a coordinate space. For example, the mapping unit 404 can compare coordinate data of the initial vertices to determine that vertex $V_2$ is positioned farthest along a particular direction in the coordinate space, vertex $V_1$ is positioned second farthest along that direction, and vertex $V_0$ is positioned least farthest along that direction. In this example, the mapping unit 404 can next reference an appropriate row of the mapping table 406 to sort the initial vertices as ($V_2$, $V_1$, $V_0$). Sorting operations can be performed based on any suitable sorting technique, such as via indirect or virtual addressing. In particular, the mapping unit 404 can maintain a set of vertex pointers based on the canonical sequence positions that are assigned to the initial vertices. Each of the vertex pointers can reference a memory location at which a corresponding one of the initial vertices is stored in the vertex memory 402. As can be appreciated, use of the vertex pointers is advantageous in terms of reducing the amount of data manipulations in connection with the sorting operations. In particular, use of the vertex pointers allows the initial vertices to be sorted without having to physically reorder the initial vertices that are stored in the vertex memory 402. However, it is also contemplated that the mapping unit 404 can perform the sorting operations via such physical reordering.

Referring to Table 1 above, the mapping table 406 stores a set of flip codes. Each of the flip codes provides an indication of whether sorting the initial vertices modifies a handedness of the graphics primitive, such as from counterclockwise to clockwise or from clockwise to counterclockwise. In particular, a flip code is set to "0" if sorting the initial vertices retains the handedness. On the other hand, a flip code is set to "1" if sorting the initial vertices modifies the handedness. Use of the flip codes is further described below in connection with operation of an assembly unit 414.

As illustrated in FIG. 4, the clipping module 400 also includes a clipping engine 408 that is connected to the vertex memory 402 and the mapping unit 404. The clipping engine 408 performs a set of clipping operations to clip the graphics primitive with respect to a set of clipping planes. In the illustrated embodiment, the clipping engine 408 performs the clipping operations by accessing the initial vertices based on their canonical sequence positions. In such manner, the clipping operations are performed in a deterministic manner, thus producing a set of new vertices that are invariant with respect to an initial vertex ordering of the graphics primitive. Referring to FIG. 4, the clipping engine 408 is implemented as a micro-coded engine and includes a clipping unit 410 and an instruction memory 412 that is connected to the clipping unit 410. The instruction memory 412 can be implemented as, for example, a ROM that stores computer code for performing the clipping operations.

Referring to FIG. 4, the clipping module 400 also includes the assembly unit 414, which is connected to the vertex memory 402, the mapping unit 404, and the clipping engine 408. The assembly unit 414 defines a clipped graphics primitive that is produced by clipping the graphics primitive with respect to the clipping planes. In particular, the assembly unit 414 defines the clipped graphics primitive based on the new vertices that are produced by the clipping operations. In some instances, the assembly unit 414 can also define the clipped graphics primitive based on one or more of the initial vertices. Referring to FIG. 4, the assembly unit 414 defines the clipped graphics primitive based on the flip codes that are stored in the mapping table 406. For example, the assembly unit 414 can reference a flip code at an appropriate row of the mapping table 406 to determine whether sorting the initial vertices has modified the handedness of the graphics primitive. In the event that sorting the initial vertices has modified the handedness, the assembly unit 414 sorts various vertices defining the clipped graphics primitive so that the clipped graphics primitive has the same handedness as the graphics primitive. For example, the clipped graphics primitive can be defined by new vertices $V_a$ and $V_b$ and the vertices $V_1$ and $V_0$, which are initially ordered as $(V_a, V_1, V_0, V_b)$. In this example, the vertices defining the clipped graphics primitive can be reordered as $(V_b, V_0, V_1, V_a)$ so as to restore the handedness of the graphics primitive, namely one that is clockwise. Sorting operations can be performed based on any suitable sorting technique, such as via indirect or virtual addressing.

Referring to FIG. 4, the clipping module 400 further includes a control unit 416, which is connected to and coordinates operations that are performed by the vertex memory 402, the mapping unit 404, the clipping engine 408, and the assembly unit 414. The control unit 416 can be implemented in any suitable manner, such as using computer code, hardwired circuitry, or a combination of computer code and hardwired circuitry.

It should be appreciated that the specific embodiments of the invention described above are provided by way of example, and various other embodiments are encompassed by the invention. For example, while some embodiments of the invention have been described in terms of reordering vertices based on their coordinate data, it is contemplated that such reordering can be performed in any other suitable manner, such as based on color data, specularity data, or texture data of the vertices. As another example, with reference to FIG. 4, while the mapping unit 404 and the assembly unit 414 are illustrated as being included in the clipping module 400, it is contemplated that either of, or both, the mapping unit 404 and the assembly unit 414 can be implemented outside of the clipping module 400.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. For example, with reference to FIG. 4, various components of the clipping module 400 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
   a mapping unit configured to map a graphics primitive onto a canonical representation, wherein the graphics primitive is defined by initial vertices having an initial order, and the mapping unit is configured to map the graphics primitive onto the canonical representation by reordering the initial vertices so as to have a canonical order that is invariant with respect to the initial order;
   a clipping engine connected to the mapping unit, the clipping engine configured to perform a set of clipping operations with respect to the canonical representation, wherein the clipping engine is configured to perform the set of clipping operations by accessing the initial vertices based on the canonical order to produce new vertices; and an assembly unit connected to the clipping engine, the assembly unit configured to define a clipped graphics primitive based on the new vertices and at least one of the initial vertices, wherein the assembly unit is configured to define the clipped graphics primitive by reordering the new vertices and the at least one of the initial vertices to restore a handedness specified by the initial order.

2. The graphics processing apparatus of claim 1, wherein the mapping unit is configured to reorder the initial vertices based on coordinate data of the initial vertices.

3. The graphics processing apparatus of claim 1, wherein the new vertices are invariant with respect to the initial order.

4. A graphics processing apparatus, comprising:
   a clipping module configured to clip a graphics primitive with respect to a set of clipping planes to produce a clipped graphics primitive that is substantially invariant with respect to an initial order of vertices defining the graphics primitive, wherein the clipping module is configured to produce the clipped graphics primitive while retaining a handedness of the graphics primitive.

5. The graphics processing apparatus of claim 4, wherein the clipping module is configured to reorder the vertices so as to have a canonical order that is invariant with respect to the initial order, and the clipping module is configured to clip the graphics primitive with respect to the set of clipping planes by accessing the vertices based on the canonical order.

6. The graphics processing apparatus of claim 5, wherein the clipping module is configured to reorder the vertices based on their relative positioning in a coordinate space.

7. The graphics processing apparatus of claim 6, wherein the clipping module is configured to determine which one of the vertices is positioned farthest along a direction in the coordinate space, and the clipping module is configured to reorder the vertices so that the one of the vertices has a canonical sequence position that is predetermined.

8. A graphics processing method, comprising:
   determining a relative positioning of initial vertices defining a graphics primitive;
   sorting the initial vertices based on the relative positioning so as to have a canonical order, wherein the initial vertices have an initial order, and the sorting the initial vertices includes sorting the initial vertices so as to have the same canonical order irrespective of the initial order; and
   clipping the graphics primitive with respect to a clipping plane by accessing the initial vertices based on the canonical order.

9. The graphics processing method of claim 8, wherein the determining the relative positioning includes determining which one of the initial vertices is positioned farthest along a direction in a coordinate space.

10. The graphics processing method of claim 9, wherein the sorting the initial vertices includes sorting the initial vertices so that the one of the initial vertices has a canonical sequence position that is predetermined.

11. The graphics processing method of claim 8, wherein the clipping the graphics primitive includes producing new vertices based on the initial vertices.

12. The graphics processing method of claim 11, further comprising:
   defining a clipped graphics primitive based on the new vertices.

13. The graphics processing method of claim 12, wherein the defining the clipped graphics primitive includes sorting the new vertices to restore a handedness of the graphics primitive.

* * * * *